(No Model.) 4 Sheets—Sheet 1.
F. MESKER & T. O. ARBEGUST.
WINDOW FRAME.
No. 450,081. Patented Apr. 7, 1891.
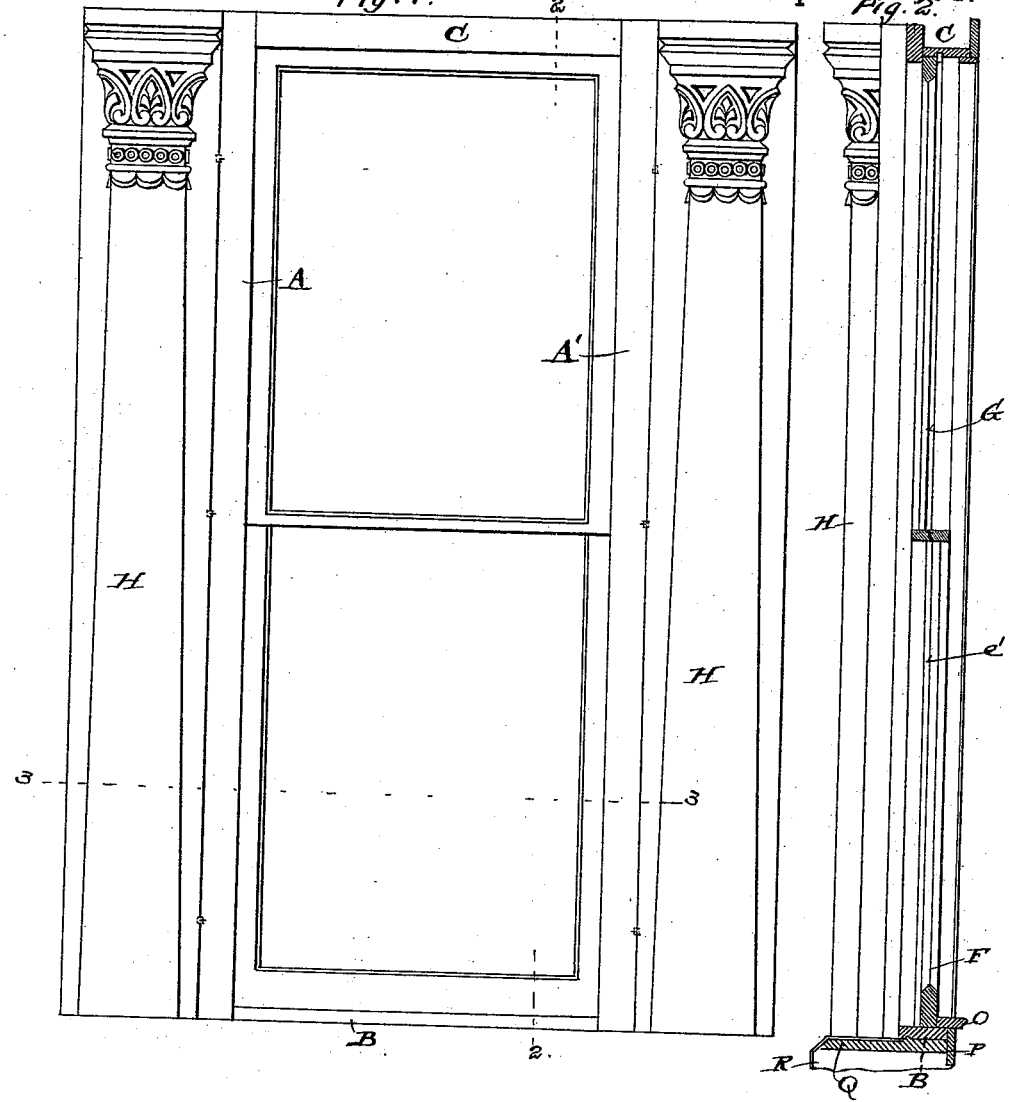
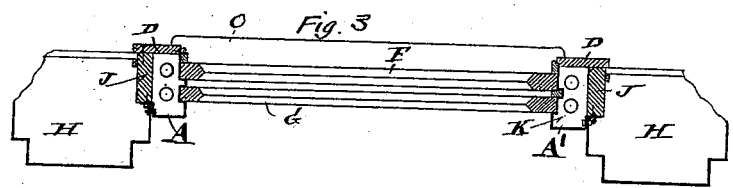
WITNESSES:
INVENTORS (No Model.) 4 Sheets—Sheet 2.
F. MESKER & T. O. ARBEGUST.
WINDOW FRAME.
No. 450,081. Patented Apr. 7, 1891.
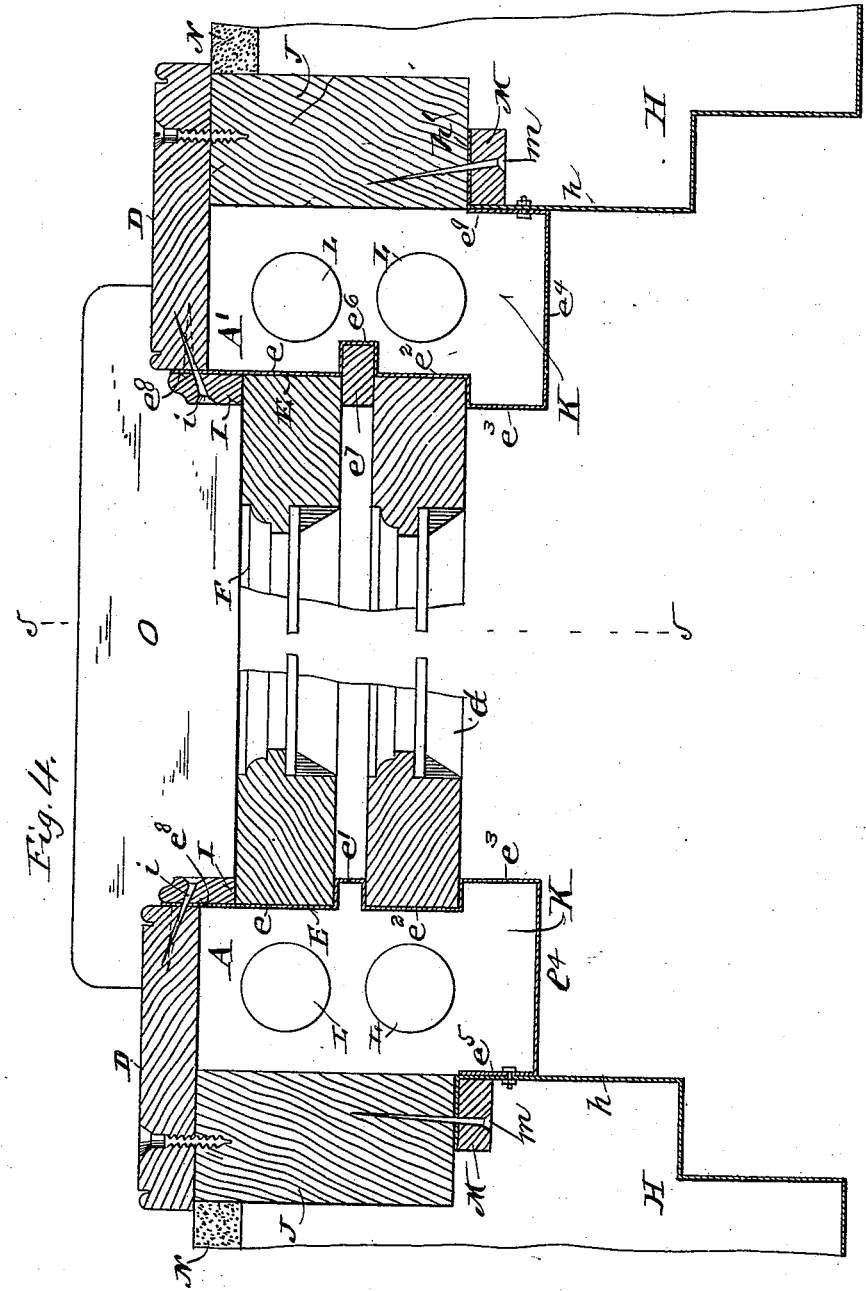
WITNESSES:
INVENTOR
ATTORNEY (No Model.) 4 Sheets—Sheet 3.
F. MESKER & T. O. ARBEGUST.
WINDOW FRAME.
No. 450,081. Patented Apr. 7, 1891.
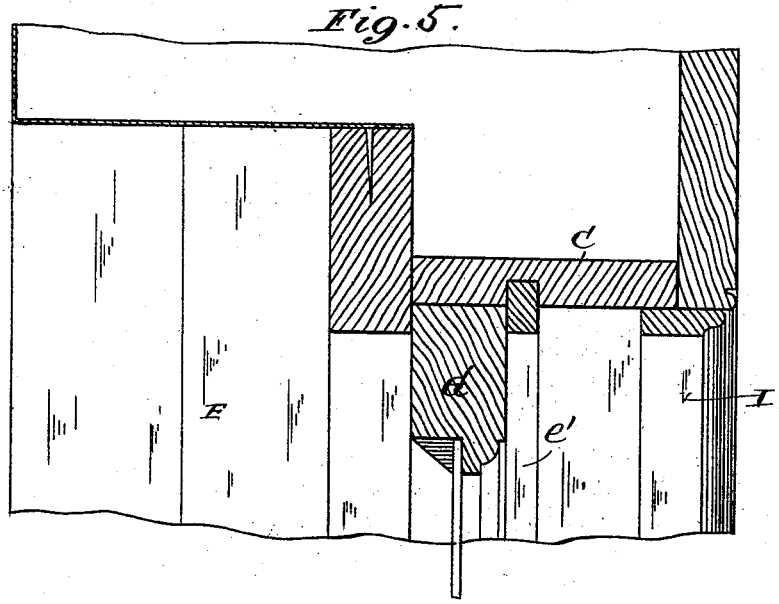
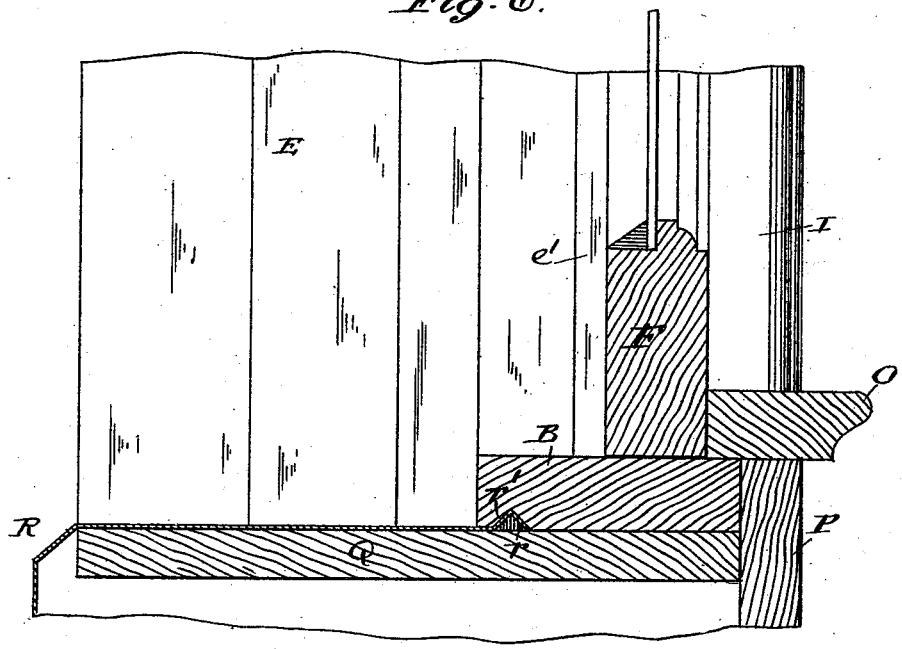
WITNESSES:
INVENTOR
ATTORNEY

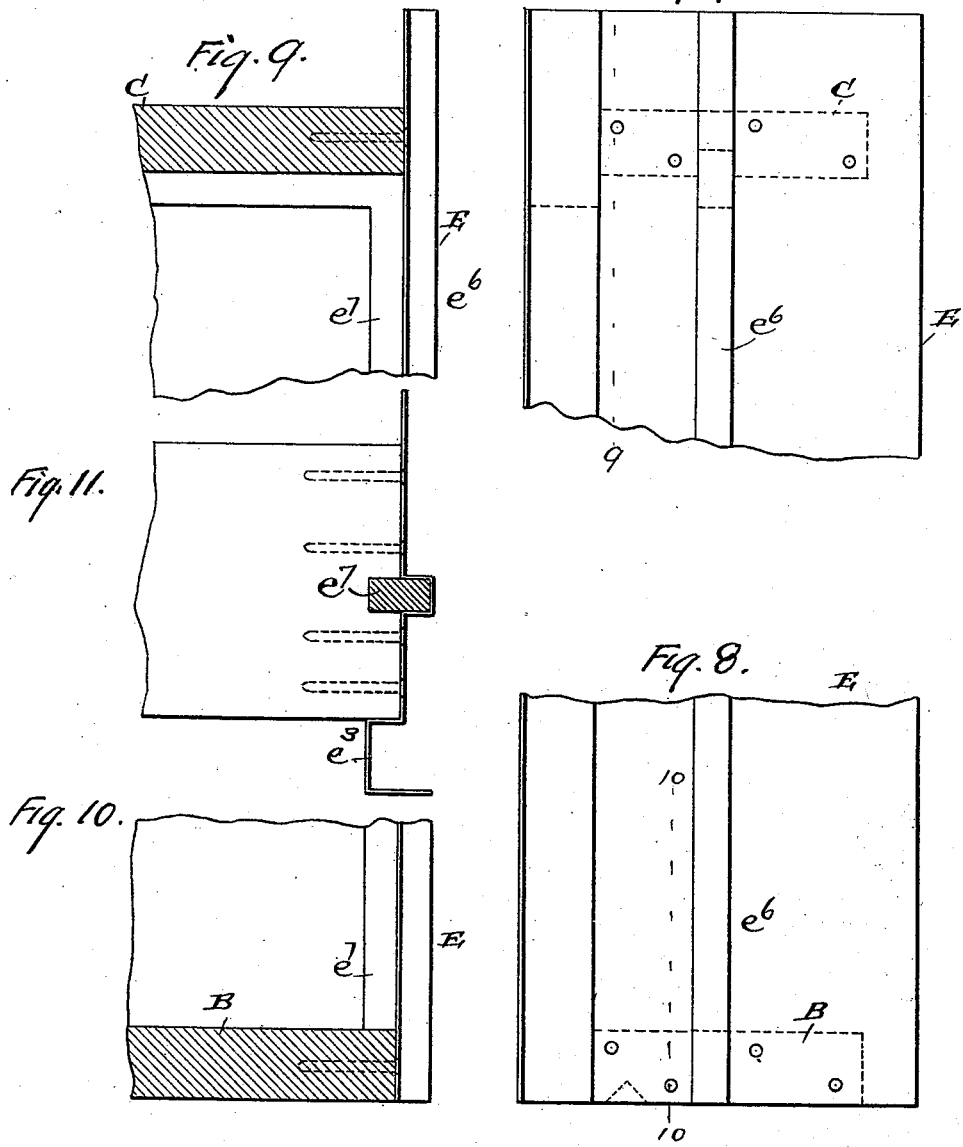

UNITED STATES PATENT OFFICE.

FRANK MESKER AND THOMAS O. ARBEGUST, OF ST. LOUIS, MISSOURI, ASSIGNORS TO MESKER & BROTHER, OF SAME PLACE.

WINDOW-FRAME.

SPECIFICATION forming part of Letters Patent No. 450,081, dated April 7, 1891.

Application filed May 2, 1890. Serial No. 350,275. (No model.)

*To all whom it may concern:*

Be it known that we, FRANK MESKER and THOMAS O. ARBEGUST, of St. Louis, Missouri, have jointly made a new and useful Improvement in Window-Frames, of which the following is a full, clear, and exact description.

Our improvement relates more especially to what are styled "box window-frames." Its leading feature is forming the stiles mainly of sheet metal; and it further consists in certain details of construction, all substantially as is hereinafter set forth and claimed, aided by the annexed drawings, making part of this specification, in which—
Figure 1 is a front elevation of the improved window-frame, including the adjacent portion of the wall containing the frame; Fig. 2, a vertical section on the line 2 2 of Fig. 1; Fig. 3, a horizontal section on the line 3 3 of Fig. 1; Fig. 4, a similar section on the line 3 3, Fig. 1, but upon an enlarged scale; Fig. 5, a vertical section of the top portion of the frame, taken on the line 5 5, Fig. 4; Fig. 6, a vertical section of the lower portion of the frame on the line 5 5, Fig. 4; Fig. 7, an elevation from the side thereof of the upper end of one of the stiles, and Fig. 8 a similar elevation of the lower end of the stile; Fig. 9, a vertical section on the line 9 9 of Fig. 7; Fig. 10, a vertical section on the line 10 10 of Fig. 8; and Fig. 11, a plan of the parts of Fig. 10, the parting-strip being in section. The last eight named views are upon an enlarged scale.

The same letters of reference denote the same parts.

The improved window-frame has the usual number of parts—namely, the stiles A and A', the sill B, the top bar C, and the parting-strips—as well as other minor parts, hereinafter described, such as are commonly more or less used in window-frame construction; but in the place of forming the stiles of wood, as hitherto has been customary, they are constructed of sheet metal largely, whereby a light stong construction is readily made, and one also which, by reason of the thinness of the sheet metal of which the stile can be made, can be contrived to occupy less space than hitherto has been needed for stiles, and, further, and especially, one better adapted to withstand the influence of the weather, and in which the window-sashes can work better than in a substantially all-wood construction.

In carrying out the improvement the stile, so far as its minor features are concerned, can be variously formed without departing from the principle of the improvement. In the present instance the procedure is as follows: Beginning at the inside of the window-frame and opposite the inside-finish board D, the metal sheet E extends horizontally to the position of the parting-strip between the sashes F G. At this point the stiles A A' preferably differ from each other in the stile A. The sheet E, after extending at $e$ sufficiently to form a bearing for the sash F, is turned and shaped at $e'$ to form a parting-strip between the sashes F G, after which the sheet is extended at $e^2$ to form a bearing for the sash G, then turned to form a stop $e^3$ on the outer side of the sash G, then turned backward at $e^4$ to form the flank or outside finish or wall of the stile, and the sheet terminates in an inwardly-extended flange $e^5$, by means of which the sheet is adapted to be secured to the adjoining wall or other fixed part. In the case of the stile A' the sheet E is similarly extended, saving that in the place of being shaped to form a parting-strip it is shaped to form a recess $e^6$, in which is held a removable parting-strip $e^7$, preferably of wood. The sheet at its inner side edge $e^8$ is in the present construction nailed to the inside-finish board D, and at its outer side edge $e^9$ is bolted to the side $h$ of the column H, and at its lower end the sheet E is, as shown in Figs. 8, 10, and 11, nailed to the sill B, and at its upper end it is, as shown in Figs. 7 and 9, nailed to the top bar C.

The construction is completed as follows: I I represent the inner stops which serve to confine the inner sash F. They are removably secured to the boards D D, and preferably by means of nails $i$, which pass through the stops and sheet edges $e^8$ into the boards D, substantially as shown. The boards D D in turn are screwed to the studs J J, respectively. These studs are arranged in the line of the wall containing the window-frame, and they serve in conjunction with the sheets E E and boards D D to inclose the spaces K K, in which the usual sashweights L L are contained and operated, and they also are used to support the columns H H, the column side $h$ having a flange $h'$, against which a strip M is laid, and all secured by means of nails $m$, passing through the strip M and flange $h'$ into the studs.

N represents a plaster coat.

O represents the customary stool, and P the apron at the inside lower part of the window-frame; Q, the outer extension of the sill, and R a metallic outer sill-covering and which is shaped at $r$ to engage in the notch $r'$ to form a weather-joint.

The window-frame at the top is finished in the usual way.

We claim—

1. The combination of the metal sheet E, board D, column H, strip M, and stud J, substantially as described.

2. The combination, in a window-frame, of a metal sheet E, having the sash-bearings $e$ $e^2$ and parting-strip $e'$, the metal sheet E having the sash-bearings $e$ $e^2$ and recess $e^6$, and the strip $e^7$, substantially as described.

3. A box window-frame stile having the sash-bearings $e$ $e^2$, the parting-strip $e'$, the stop $e^3$, and flank $e^4$, formed of a piece of sheet metal, substantially as described.

4. The combination of the sheet E, shaped to form the bearings $e$ $e^2$, the parting-strip $e'$, and the stop $e^3$ with stop I, and the sashes F G, substantially as described.

5. The combination of the sheet E, having the edge $e^8$, and shaped to form the bearings $e$ $e^2$, the recess $e^6$, the stop $e^3$ with the strip $e^7$, the stop I, and the sashes F G, substantially as described.

FRANK MESKER.
THOMAS O. ARBEGUST.

Witnesses:
C. D. MOODY,
C. C. LOGAN.